(12) United States Patent
Madison et al.

(10) Patent No.: US 6,961,070 B1
(45) Date of Patent: Nov. 1, 2005

(54) METHOD TO GRAPHICALLY REPRESENT WEAPON EFFECTIVENESS FOOTPRINT

(75) Inventors: Richard Wade Madison, Mission Viejo, CA (US); John Franklin Ebersole, Jr., Bedford, NH (US); John Franklin Ebersole, Bedford, NH (US)

(73) Assignee: Information Decision Technologies, LLC, Bedford, NH (US)

( * ) Notice: Subject to any disclaimer, the term of this patent is extended or adjusted under 35 U.S.C. 154(b) by 155 days.

(21) Appl. No.: 10/123,316

(22) Filed: Apr. 16, 2002

Related U.S. Application Data

(63) Continuation-in-part of application No. 09/513,152, filed on Feb. 25, 2000.

(60) Provisional application No. 60/284,338, filed on Apr. 17, 2001.

(51) Int. Cl.$^7$ .......................... G09G 5/00; A63B 67/00; F41J 9/14

(52) U.S. Cl. ...................... 345/632; 345/629; 345/619; 345/810; 273/351; 273/358

(58) Field of Search .............................. 345/619, 622, 345/623, 440, 180, 810, 156, 419, 632, 629; 273/351, 358

(56) References Cited

U.S. PATENT DOCUMENTS

| | | | | | |
|---|---|---|---|---|---|
| 3,558,865 | A | * | 1/1971 | Berndt et al. | 345/440 |
| 3,736,411 | A | * | 5/1973 | Berndt | 345/440 |
| 3,793,481 | A | * | 2/1974 | Ripley et al. | 345/180 |
| 3,880,043 | A | * | 4/1975 | Cox et al. | 89/1.56 |
| 4,478,581 | A | * | 10/1984 | Goda | 434/22 |
| 5,586,219 | A | * | 12/1996 | Yufik | 345/810 |
| 6,061,068 | A | * | 5/2000 | Hoffman et al. | 345/619 |
| 6,254,394 | B1 | * | 7/2001 | Draper et al. | 434/11 |

* cited by examiner

*Primary Examiner*—Sumati Lefkowitz
*Assistant Examiner*—Chante Harrison
(74) *Attorney, Agent, or Firm*—Brian M. Dingman, Esq.; Mirick O'Connell DeMallie & Lougee, LLP

(57) ABSTRACT

The invention is a method for augmenting images with the predicted effectiveness of ordinance deployed or dropped at a specific aim point. The method uses JMEM data to calculate the predicted effectiveness of a selected weapon over an area surrounding the aimpoint and calculates the parameters for a graphical representation of the numerical results. Predicted effectiveness is displayed onto an overhead or perspective view image by overlaying with a series of ellipses, a variable color area, a variable transparency area, or some combination of the three.

15 Claims, 5 Drawing Sheets

METHOD TO GRAPHICALLY REPRESENT WEAPON EFFECTIVENESS FOOTPRINT

CROSS REFERENCE TO RELATED APPLICATION

This application claims priority of Provisional patent application No. 60/284,338 filed Apr. 17, 2001 and is a continuation in part of pending application Ser. No. 09/513,152 filed on Feb. 25, 2000.

GOVERNMENT RIGHTS

This invention was made with Government support under Contract Number DATM01-00-C-0005 awarded by the Department of the Army. The Government has certain rights in the invention.

FIELD OF THE INVENTION

This invention relates to computer graphics, damage estimation, and attack planning. It defines a way to augment imagery with a graphical representation of the probability of weapon effectiveness as a function of weapon, target, and weapon release parameters

COPYRIGHT INFORMATION

A portion of the disclosure of this patent document contains material that is subject to copyright protection. The copyright owner has no objection to the facsimile reproduction by anyone of the patent document or the patent disclosure as it appears in the Patent and Trademark Office records but otherwise reserves all copyright works whatsoever.

BACKGROUND OF THE INVENTION

Pilots in aircraft on attack runs are overloaded with information, with enemies attacking, and on a short timescale. One difficulty they have is that when looking down at their displays with an aimpoint, it is not always immediately obvious what the scale is, nor what the relative effects of their munitions will be.

Another common problem is in mission planning. Graphical representations of predicted weapon system effectiveness can greatly speed up the process of mission planning, selecting optimal ordinance to use in a given sortie, and estimating probability of success of a mission before committing forces or other resources.

Predicted weapon effectiveness is calculated using Joint Munition Effectiveness Manuals (JMEMs). Unfortunately, JMEM data and algorithms only yield numerical output and there are so many possible variations of weapon systems and initial conditions that no one can "memorize" or otherwise maintain an intuitive yet accurate feel for it. What is needed is a way to graphically represent JMEM data in a human understandable form. Such a graphical representation would not only speed up the process of mission planning, but would also allow the warfighter to make mission and weapon selection adjustments in the field to correct for unexpected errors in intelligence data or enemy force placement.

Overview of the Joint Munition Effectiveness Manuals (JMEMs)

The Joint Technical Coordinating Group for Munitions Effectiveness (JTCG/ME) publishes Joint Munition Effectiveness Manuals, containing information about the effectiveness of various weapons against various targets, under various weapon release conditions. JMEM 61A1-1-1-1 combines statistical theory and tables of live-fire test data into algorithms to determine, among other things, the probability that a particular air-to-ground weapon, launched under particular conditions, will destroy a particular target.

The basic algorithm can be derived as follows. A Gaussian probability distribution describes the location at which a weapon will land, as a function of distance from the weapon aimpoint. The variance of the Gaussian depends on a number of factors, such as the weapon guidance method (e.g., unguided, laser guided, GPS guided) and the angle between weapon trajectory and ground plane at impact. These factors provide different variance in range and deflection directions (parallel and perpendicular to weapon trajectory, respectively), resulting in a two-dimensional, elliptical probability distribution. A scaled Gaussian distribution, or a scaled step function, describes the probability that a weapon will destroy a target at a given distance from its impact location. These distributions depend on factors such as the strength of the warhead and the type of target, and may be different in range and deflection directions. The convolution of the two distributions provides a single distribution describing the probability of destroying a target ($P_{KILL}$) as a function of distance from weapon aim point, weapon type, target type, and release conditions. JMEM algorithms calculate and report $P_{KILL}$ at the weapon aimpoint.

The JMEM algorithms feature more advanced capabilities as well. They calculate the effectiveness against area targets by integrating the portion of the $P_{KILL}$ distribution that overlaps an area. They calculate the effectiveness of multiple weapons against a single target using standard statistical combination ($p_n=1-(1-p)^n$). They calculate the effect of a series of potentially overlapping weapon impacts as the integrated probability of kill of each weapon, multiplied by the number of weapons, divided by the area covered by the series of impacts. They calculate $P_{KILL}$ for cluster weapons, using the above calculations for area targets and series of weapons to generate a cluster weapon's damage distribution within its blast pattern, approximate that as a step function, and apply the basic algorithm.

SUMMARY OF THE INVENTION

The invention comprises a method for augmenting images with the predicted effectiveness of ordinance deployed or dropped at a specific aimpoint. The preferred embodiment of the invention uses JMEM data to calculate the predicted effectiveness of a selected weapon over an area surrounding the aimpoint and calculates the parameters for a graphical representation of the numerical results. Predicted effectiveness is then displayed by overlaying an overhead or perspective view image of a scene with an appropriate graphical representation of the calculated predicted effectiveness, such as a series of ellipses, a variable color area, a variable transparency area, or some combination of the three. The invention thus graphically displays weapon impact footprints at the aimpoint, showing the size of the area affected by the weapon, and the relative affect.

BRIEF DESCRIPTION OF THE DRAWINGS

Other objects, features and advantages will occur to those skilled in the art from the following description of the preferred embodiments and the accompanying drawings in which.

DETAILED DESCRIPTION OF THE PREFERRED EMBODIMENTS OF THE INVENTION

Weapon Effectiveness Footprint

The first step in the invention is to generate a $P_{KILL}$ footprint. This is preferably accomplished generally as described above, but instead of only directly calculating the value of the distribution at the aimpoint, the inventive method accomplishes the calculation of a small number of parameters that describe the entire distribution. These parameters include the means and deviations of a two-dimensional Gaussian distribution, and possibly the two-dimensional step widths required to convert a Gaussian distribution into an error function. The algorithm uses the same procedures as JMEMs to accumulate the effects of multiple simultaneous weapons and cluster weapons. The parameters can be applied to an arbitrary 2D point relative to the weapon aimpoint, and produce the same $P_{KILL}$ as JMEMs when applied at the aimpoint. The algorithm does not accumulate for area targets or series of weapons, as the footprint representation allows direct calculation of $P_{KILL}$ at any given point in an area target or under overlapping footprints.

Figure 1:
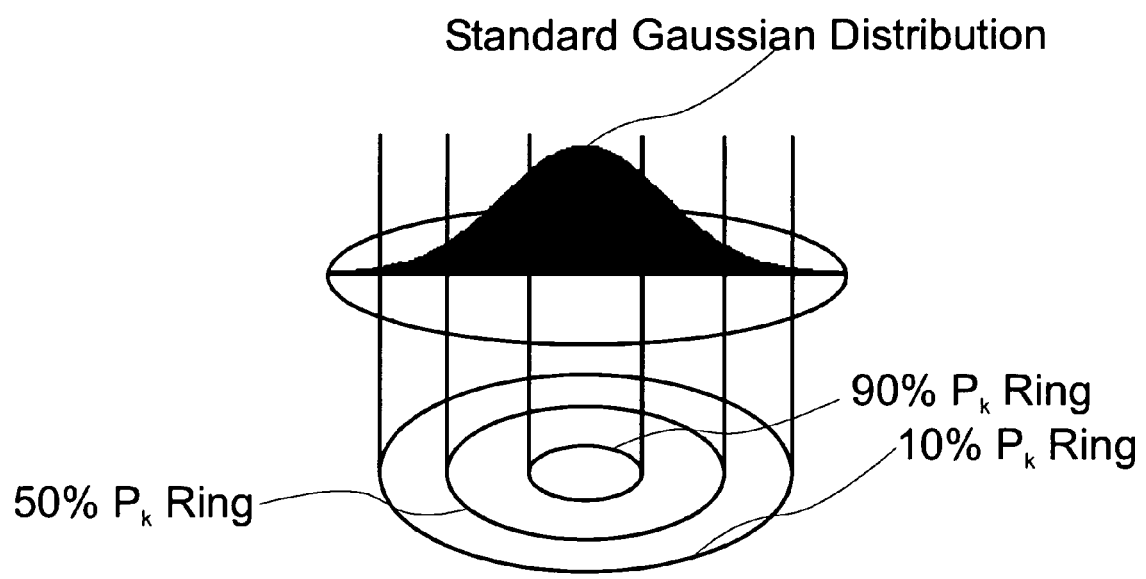
FIG. 1 shows the relationship between the fixed value contour ellipses to a continuous Gaussian distribution, useful in understanding the invention.
Figure 2:
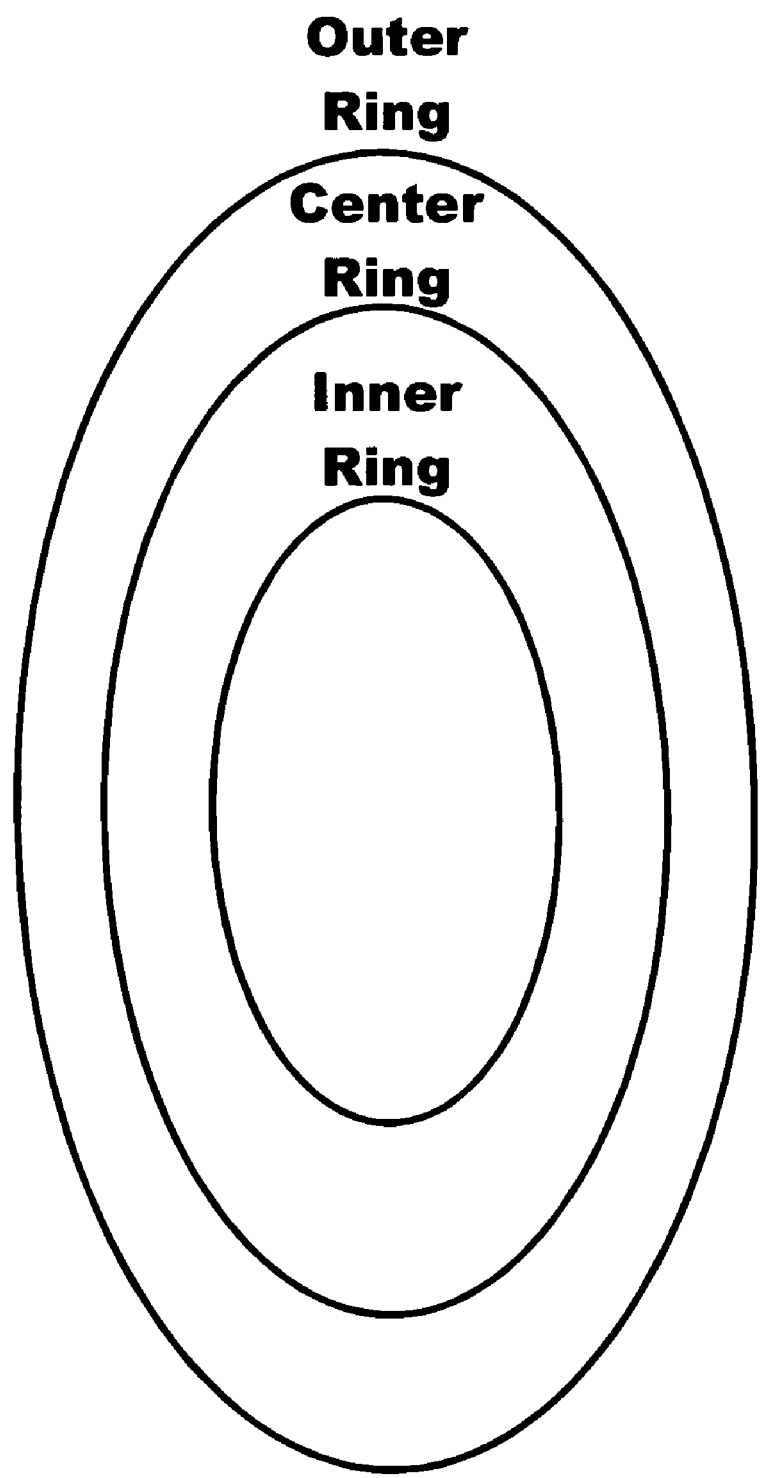
FIG. 2 is a set of ellipses used in the embodiment of the invention enclosing regions of interest.

The calculated effectiveness footprint is represented graphically, preferably in one of two ways. The first representation may be, for example, a pattern of one or more colors (e.g., yellow and red) with intensity proportional to $P_{KILL}$. FIG. 1 gives an indication of how the pattern would preferably be structured. In the bottom part of the figure, contour rings represent constant $P_{KILL}$ intensity. The contours are preferably elliptical, reflecting the difference in $P_{KILL}$ variance in range and deflection directions. The top part of the figure illustrates intensity along a cross-section of the pattern. In the preferred embodiment, points at higher probability are shown in red, and points at lower probability are shown in yellow. The division is arbitrary, but in one embodiment, points with probability below 50% are shown in yellow, while the color fades linearly from yellow to red between 50% and 100%. Another preferred representation comprises a set of ellipses drawn at constant $P_{KILL}$. In one embodiment, ellipses are displayed to mark 10%, 50%, and 90% $P_{KILL}$. FIG. 2 illustrates an example set of ellipses marking 10% (outer ring), 50% (center ring), and 90% (inner ring) $P_{KILL}$. The preferred embodiment uses either or both of these representations depending upon the application.

The footprint pattern can be stored as a grid of points as follows. The footprint parameters are used to determine the range and deflection at which the footprint falls to a chosen probability. A rectangular grid with a chosen number of points is scaled to cover this footprint, the distribution is sampled at the grid points, and the samples are converted to colors that are assigned to the grid points. A graphics API, such as OpenGL, is used to draw the grid as a mesh of triangles, blending the color between grid points. Such an API can blend the mesh into a scene, showing intense color at areas of high $P_{KILL}$ and being nearly transparent at areas of lower $P_{KILL}$.

Variable gain on the footprint pattern can be implemented in order to allow a user to make the pattern more or less transparent, to see the scene underneath while providing enough dynamic range to see the intensity gradient in the pattern. The ellipse representation, used in conjunction with the pattern, provides a consistent marker of fixed probabilities, as a counterbalance to the flexible meaning of a particular intensity. The ellipse representation may be used by itself to maximize the ability to view the imagery underneath, while still providing the information represented by the rings.

A Baseline Algorithm

In summary, the algorithm of this invention proceeds as follows. A user is allowed to select a weapon, a target type, an aimpoint, and any weapon release parameters required by JMEMs. Equations analogous to those of JMEMs calculate a small set of parameters that describe a probability of kill distribution. This distribution is sampled along a grid of points and converted to distinctive graphical representation values at those points. Color is the preferred representation. The grid is projected into a scene using a graphics API. The API then draws the grid as a polygonal (e.g., triangular) mesh, blending color between the grid points, and blending the mesh into the scene background with opacity proportional to $P_{KILL}$. Finally, ellipses may also be drawn, for instance at 10%, 50%, and 90% $P_{KILL}$.

Augmenting Maps for Battle Planning

One embodiment of this invention provides an interface that allows a user to interactively modify weapon parameters and see the effects on the weapon effectiveness footprint on an overhead view of the battlefield. The interface has three important features, depicted in the example implementation in FIG. 3.

Figure 3:
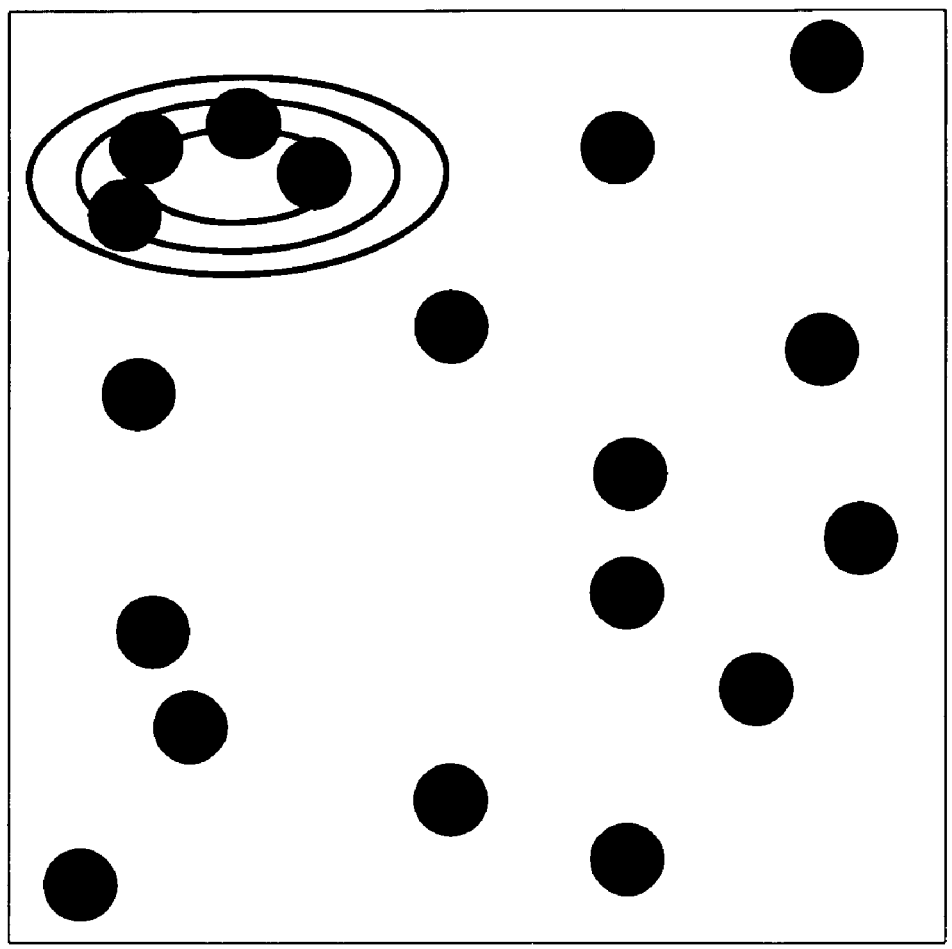
FIG. 3 is a line drawing representation of an augmented display created by the invention on an overhead map image.

The first feature is a map, satellite or aerial recon image, SAR image, or other overhead view, schematically depicted in FIG. 3, with targets depicted as dark circles. The effectiveness footprint is blended onto the image, allowing the user to see the probable effectiveness of the weapon against one or more targets inside the footprint. The interface can allow the user to zoom the image, to see the whole battlefield or a particular cluster of targets. A $P_{KILL}$ readout below the map reports the calculated $P_{KILL}$ at the map location under the cursor, so that the user can position the cursor over a particular target (or any map area) and see the exact effectiveness at that point.

Another feature is a list of weapons. This could be a list of the actual weapons available on a group of aircraft, for real-time battle planning, or all known weapons, for trade studies during advanced planning. When the user selects a weapon and an aimpoint on the map, the effectiveness footprint is calculated and displayed at the aimpoint. The user can adjust the aimpoint, for example to maximize damage against proposed targets, or reduce damage to unintended targets such as friendly vehicles. The user can also select a new weapon or multiple weapons to see the effectiveness of various weapons and quantities of weapons, against the target(s) at a given aimpoint.

Another feature is a list of the various parameters that the equations of the invention require, such as target type, airspeed at weapon release, altitude, dive angle, quantity of bombs, fuse type, release interval, and weapon guidance type (unguided, laser guided, GPS guided, etc.). The algorithm uses JMEM tables to convert the parameters into the parameters of the probability distributions that define the weapon effectiveness footprint. Default parameter values for each weapon are provided, but the user can modify the default values, and see how new values affect the effectiveness footprint. The user can also specify aircraft direction at weapon release, which determines how the footprint is oriented with respect to the map.

The invention can be used to plan a specific battle. It can include an editor to specify a list of aircraft and their weapons. The weapons can be darkened or otherwise marked on the displayed weapon list when their damage footprint is shown on the map, indicating that they are already committed. The invention can transmit to an aircraft the list of aimpoints and corresponding weapons and release parameters assigned to it.

Augmenting Reality for Strike Planning

An alternate embodiment of the invention displays the footprint by superimposing it onto a scene that is not of an overhead view. In order to accomplish this, the position and orientation, with respect to flat ground, of the camera observing the scene must be defined. This information would be available in a simulation or in a combat aircraft due to onboard GPS. The user provides a weapon aimpoint on the ground, for instance using the standard target designating procedure in a simulator or aircraft. The orientation of the footprint is the same as the camera at weapon release. This information is sufficient to calculate the position and orientation of the footprint with respect to the camera, and thus how the footprint projects onto the camera's image plane, resulting in a proper perspective view of the footprint on the user's display screen.

Figure 4:
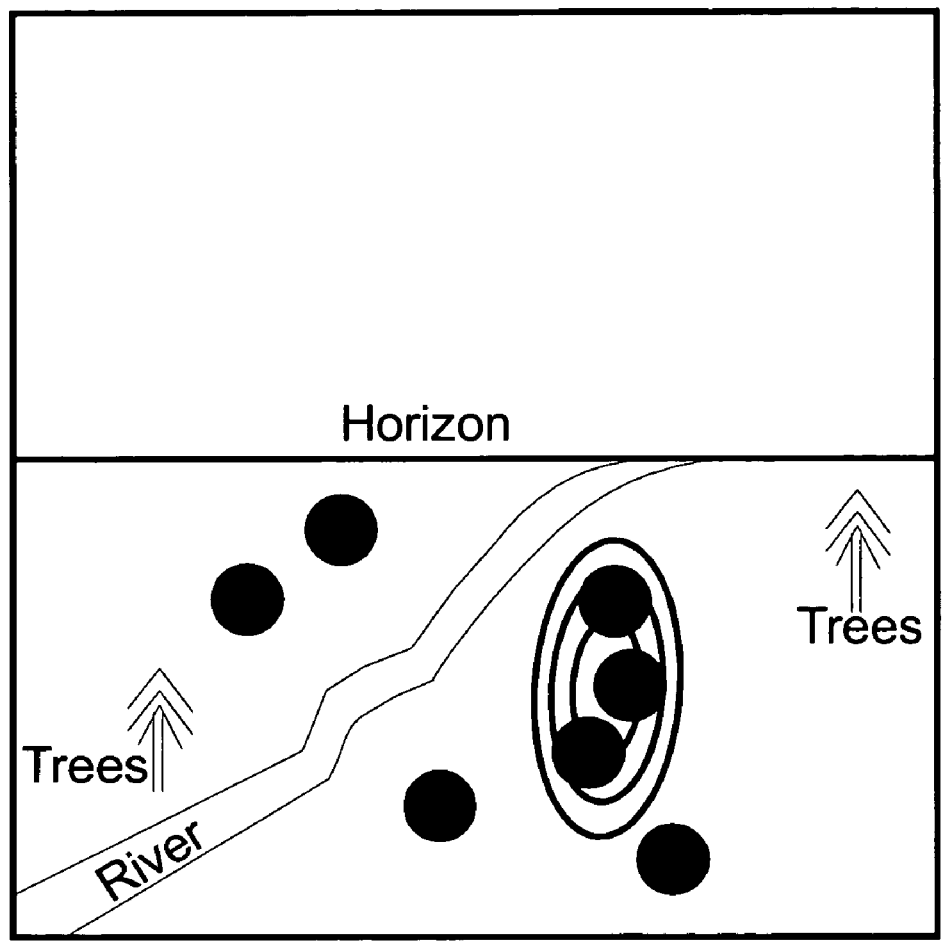
FIG. 4 is a line drawing representation of an augmented display created by the invention overlaid upon a perspective view of an outdoor scene.

FIG. 4 shows an example implementation of this feature in the computerized display of an attack aircraft. Again, the circles represent targets. The calculated $P_{KILL}$ contours are overlaid to visually represent the calculated values. Menus along the sides of the display (not shown) can be added to allow the user to select weapon, target type, and release conditions. The present invention generates a weapon effectiveness footprint based on these parameters, and uses the OpenGL graphics API to project the footprint into the scene as describe above, and blend the footprint into the image. A pilot, WSO, or UCAV operator might use this system to plan a specific weapon drop, testing the impact of changing parameters such as release altitude to modify a mission in flight.

One embodiment of the invention extends to add a second set of ellipses at the expected impact location, when this differs from the aimpoint. This can occur when the aimpoint is out of range of a guided weapon, or the aircraft is not at the right position and orientation to deliver an unguided weapon to the chosen aimpoint. This allows the user to see how far off from proper delivery of the weapon he is, and see where the weapon would land if it was launched at the given moment.

Representing Friendly and Enemy Activity

Figure 5:
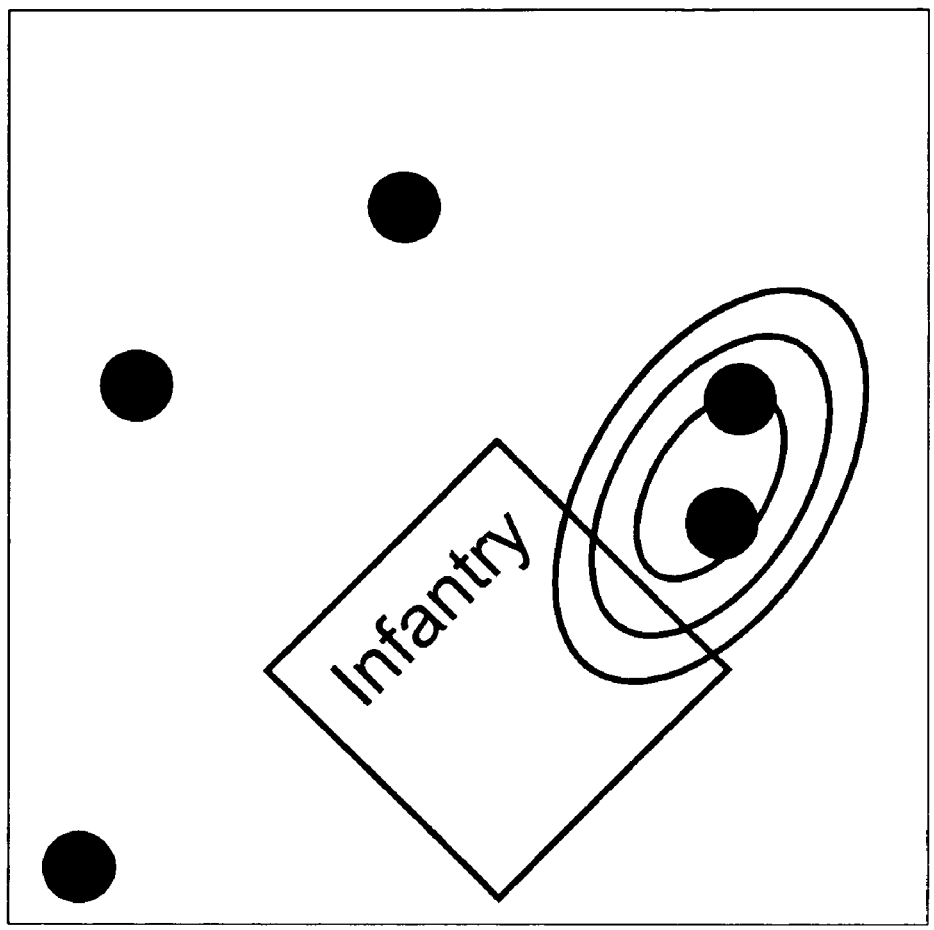
FIG. 5 is a line drawing of an augmented display created by the invention with a SAR (synthetic aperture radar) image, which appears as an overhead view as SAR images normally do.

Another embodiment of the invention augments a scene or map with additional graphics to represent areas of probable friendly or enemy activity. In one example, these are accomplished with red or blue semi-transparent polygons, blended onto the same image as the weapon effectiveness footprints. The overlap of these areas with the weapon impact footprints allows a user to estimate the extent to which a weapon will affect enemy or friendly units. FIG. 5 shows an example of a weapon effectiveness footprint overlapping an area that might, for instance, contain infantry (the rectangular object on the image). The ellipses show that part of the area falls with the weapon's 50% $P_{KILL}$ zone. If the area is friendly, the user might modify the aimpoint to avoid fratricide. Conversely, if the area is enemy, it might be better to retarget to cover more of the area.

In FIG. 5, the user may choose either to input weapon aimpoints or to designate friendly/enemy areas (such as the rectangular object on the image discussed above). This allows the user to use the invention as a complex markup board to fully plan attacks.

The user who is selecting weapon aimpoints may not be same user who designates friendly/enemy areas but the same interface may be used to perform either function. This is useful in that many scenarios are very complex, and constantly changing, such that a single user could not enter in all the information. In this situation, all users can share a single database containing all information.

A Teaching Tool

The present invention has so far been described in terms of operational uses. It is also useful as a teaching tool. By selecting weapons, targets, and parameters, and then seeing the weapon effectiveness footprint, the user is able to gain an intuition for the size of the damage footprint. This intuition then allows the user to internally visualize how a blast would likely affect neighboring targets and non-targets even when the visualization tool is not present.

Other embodiments will occur to those skilled in the art and are within the following

What is claimed is:

1. A method of displaying to a user, on an image of a scene captured by a camera carried by an aircraft or associated with a simulator of such aircraft, a predicted effectiveness of a weapon that can be launched from the aircraft, if the weapon were to be launched from the aircraft toward a weapon aim point located in the scene, the method comprising:

providing to the user a menu of weapon types that can be carried by and launched from the aircraft;

determining the position and orientation of the camera with respect to the scene;

allowing the user to select a weapon type from the menu;

allowing the user to define weapon release conditions, including release altitude, target type, airspeed, dive angle, quantity of weapons, fuse type, release interval and weapon guidance type;

allowing the user to select a weapon aim point in the scene;

calculating, from at least the weapon type and the defined release conditions, a predicted effectiveness of the selected weapon type at the selected aim point;

determining, from the calculated predicted effectiveness, a weapon effectiveness footprint;

calculating, from the determined effectiveness footprint and the determined position and orientation of the camera with respect to the scene, the weapon effectiveness footprint with respect to the aim point;

blending the calculated weapon effectiveness footprint with the scene; and displaying to the user the blended scene, including the calculated weapon effectiveness footprint.

2. The method of claim 1, wherein the calculated weapon effectiveness footprint comprise a graphical representation of the determined weapon effectiveness footprint.

3. The method of claim 2, wherein the graphical representation comprises an intensity map.

4. The method of claim 3, wherein the intensity map comprises one or more colors.

5. The method of claim 4, wherein intensity is indicated at least in part using different colors.

6. The method of claim 5, wherein the intensity is indicated in part by fading between different colors.

7. The method of claim 4, wherein the graphical representation further comprises a varied color opacity relative to the predicted effectiveness.

8. The method of claim 2, wherein the graphical representation comprises one or more contours.

9. The method of claim 8, wherein the graphical representation comprises one or more contours representing constant predicted effectiveness.

10. The method of claim 9, wherein the contours comprise ellipses.

11. The method of claim 1, further comprising also displaying on the scene a representation of one or more targets.

12. The method of claim 11, further comprising also displaying on the scene a representation of one or more friendly positions, using a representation that is distinct from the target representation, to allow the user to distinguish between friend and foe.

13. A method of displaying to a user, on an image of a scene captured by a camera carried by an aircraft or associated with a simulator of such aircraft, a predicted effectiveness of a weapon that can be launched from the aircraft, if the weapon were to be launched from the aircraft toward a weapon aim point located in the scene, the method comprising:

providing to the user a menu of weapon types that can be carried by and launched from the aircraft;

determining the position and orientation of the camera with respect to the scene;

allowing the user to select a weapon type from the menu;

allowing the user to define weapon release conditions, including release altitude, target type, airspeed, dive angle, quantity of weapons, fuse type, release interval and weapon guidance type;

allowing the user to select a weapon aim point in the scene;

calculating, from at least the weapon type, the target type, and the defined release conditions, a predicted effectiveness of the selected weapon type at the selected aim point;

determining, from the calculated predicted effectiveness, a weapon effectiveness footprint;

calculating, from the determined effectiveness footprint and the determined position and orientation of the camera with respect to the scene, the weapon effectiveness footprint with respect to the aim point, wherein the calculated weapon effectiveness footprint comprise a graphical representation of the determined weapon effectiveness footprint;

blending the calculated graphical representation with the scene; and displaying to the user the blended scene, including the calculated graphical representation, along with a representation of one or more targets.

14. The method of claim 13, wherein the release conditions comprise release altitude, target type, airspeed, dive angle, quantity of weapons, fuse type, release interval and weapon guidance type.

15. A method of displaying to a user, on an image of a scene captured by a camera carried by an aircraft or associated with a simulator of such aircraft, a predicted effectiveness of a weapon that can be launched from the aircraft, if the weapon were to be launched from the aircraft toward a weapon aim point located in the scene, the method comprising:

providing to the user a menu of weapon types that can be carried by and launched from the aircraft;

determining the position and orientation of the camera with respect to the scene;

allowing the user to select a weapon type from the menu;

allowing the user to define weapon release conditions, including release altitude, target type, airspeed, dive angle, quantity of weapons, fuse type, release interval and weapon guidance type;

allowing the user to select a weapon aim point in the scene;

calculating, from at least the weapon type, the target type, and the defined release conditions, a predicted effectiveness of the selected weapon type at the selected aim point;

determining, from the calculated predicted effectiveness, a weapon effectiveness footprint;

calculating, from the determined effectiveness footprint and the determined position and orientation of the camera with respect to the scene, the weapon effectiveness footprint with respect to the aim point, wherein the calculated weapon effectiveness footprint comprise a graphical representation of the determined weapon effectiveness footprint, the graphical representation comprising elliptical contours representing constant predicted effectiveness;

blending the calculated elliptical contours with the scene; and displaying to the user the blended scene, including the calculated elliptical contours, along with a representation of one or more targets.

* * * * *